United States Patent
Janot et al.

(10) Patent No.: US 10,922,443 B2
(45) Date of Patent: Feb. 16, 2021

(54) SYSTEM FOR PROTECTING AN INPUT DEVICE

(71) Applicant: INGENICO GROUP, Paris (FR)

(72) Inventors: Cyril Janot, Dijon (FR); Alain Soubirane, Bourg-les-Valence (FR); Didier Georges, Chabeuil (FR)

(73) Assignee: INGENICO GROUP, Paris (FR)

( * ) Notice: Subject to any disclaimer, the term of this patent is extended or adjusted under 35 U.S.C. 154(b) by 313 days.

(21) Appl. No.: 15/737,987

(22) PCT Filed: Jun. 17, 2016

(86) PCT No.: PCT/EP2016/064089
§ 371 (c)(1),
(2) Date: Dec. 19, 2017

(87) PCT Pub. No.: WO2016/203022
PCT Pub. Date: Dec. 22, 2016

(65) Prior Publication Data
US 2018/0300509 A1    Oct. 18, 2018

(30) Foreign Application Priority Data
Jun. 19, 2015   (FR) ..................................... 15 55626

(51) Int. Cl.
*G06F 21/83*   (2013.01)
*G06F 21/86*   (2013.01)
*H01H 3/16*    (2006.01)

(52) U.S. Cl.
CPC .............. *G06F 21/83* (2013.01); *G06F 21/86* (2013.01); *H01H 3/16* (2013.01); *G06F 2221/2123* (2013.01); *H01H 2211/032* (2013.01)

(58) Field of Classification Search
CPC ........... G06F 21/83; G06F 21/86; H01H 3/16; G08B 29/046; H05K 5/0208
See application file for complete search history.

(56) References Cited

U.S. PATENT DOCUMENTS

| | | | | |
|---|---|---|---|---|
| 5,889,855 A | * | 3/1999 | Davis | G08B 29/046 200/43.22 |
| 6,054,930 A | * | 4/2000 | Guillon | G01F 15/007 324/110 |
| 6,895,509 B1 | * | 5/2005 | Clark | G06F 21/87 257/922 |

(Continued)

FOREIGN PATENT DOCUMENTS

| | | |
|---|---|---|
| EP | 1826702 A1 | 8/2007 |
| FR | 2860643 A1 | 4/2005 |

OTHER PUBLICATIONS

International Search Report and Written Opinion dated Jul. 14, 2016 for International Application No. PCT/EP2016/064089, filed Jun. 17, 2016.

(Continued)

*Primary Examiner* — Vance M Little
(74) *Attorney, Agent, or Firm* — David D. Brush; Westman, Champlin & Koehler, P.A.

(57) ABSTRACT

A system for protecting an input device. The system includes a pressurizing device and a printed circuit board having a false key. The pressurizing device includes a tube for receiving a flexible pressurizing element. A spacer of a predetermined length is disposed at a bottom of the tube.

9 Claims, 3 Drawing Sheets

(56) References Cited

U.S. PATENT DOCUMENTS

| | | | | |
|---|---|---|---|---|
| 2006/0092020 A1* | 5/2006 | Wilson | G08B 29/046 | 340/547 |
| 2006/0197662 A1* | 9/2006 | Castle | G08B 29/046 | 340/545.6 |
| 2007/0013235 A1* | 1/2007 | Fein | G06F 21/81 | 307/116 |
| 2007/0040674 A1* | 2/2007 | Hsu | G08B 29/046 | 340/539.31 |
| 2007/0062791 A1 | 3/2007 | Quinque | | |
| 2007/0290845 A1* | 12/2007 | Benjelloun | G08B 29/046 | 340/568.1 |
| 2008/0230355 A1 | 9/2008 | Leon | | |
| 2009/0133610 A1* | 5/2009 | Baker | H04Q 1/025 | 109/50 |
| 2010/0008057 A1* | 1/2010 | Bonnet | G06F 21/86 | 361/796 |
| 2012/0032907 A1* | 2/2012 | Koizumi | G06F 3/0414 | 345/173 |
| 2012/0062252 A1* | 3/2012 | Rossi | G06F 21/86 | 324/686 |
| 2014/0000385 A1* | 1/2014 | Duits | G01L 5/16 | 73/862.042 |
| 2014/0123764 A1* | 5/2014 | Abtahi | G01L 11/025 | 73/705 |
| 2015/0318628 A1* | 11/2015 | Lee | H01R 13/2421 | 439/78 |
| 2016/0182500 A1* | 6/2016 | Ligatti | H04L 63/0407 | 713/156 |

OTHER PUBLICATIONS

English Translation of the International Search Report, dated Jul. 14, 2016 for International Application No. PCT/EP2016/064089, filed Jun. 17, 2016.

English Translation of the International Preliminary Report on Patentability dated Sep. 29, 2017 for International Application No. PCT/EP2016/064089, filed Jun. 17, 2016.

* cited by examiner

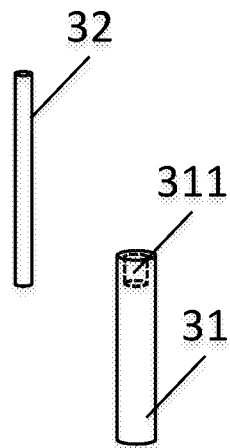
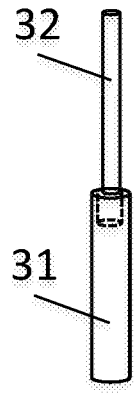
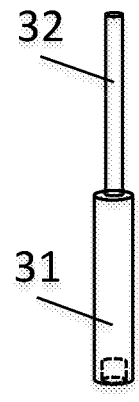
Figure 4a    Figure 4b    Figure 4c
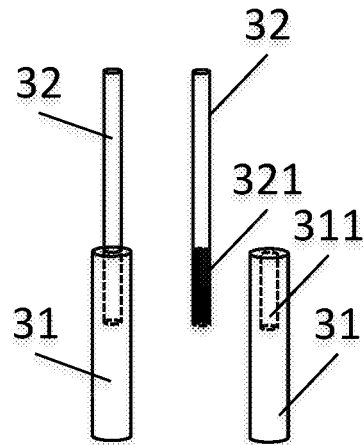
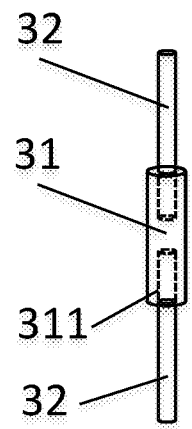
Figure 5a    Figure 5b

SYSTEM FOR PROTECTING AN INPUT DEVICE

CROSS-REFERENCE TO RELATED APPLICATIONS

This Application is a Section 371 National Stage Application of International Application No. PCT/EP2016/064089, filed Jun. 17, 2016, which is incorporated by reference in its entirety and published as WO 2016/203022 A1 on Dec. 22, 2016, not in English.

1. FIELD OF THE INVENTION

The proposed technique relates to the field of electronic devices. More particularly, the proposed technique relates to electronic devices that require securing or protecting functions. The proposed technique relates more particularly to the field of securing or protection units that implement a protection technique known as the "false key" technique. The proposed technique can be applied especially to entry or input devices such as payment terminals.

2. PRIOR ART

Input devices such as payment terminals need to be protected against attempts at fraud. Thus, protective measures are implemented. These protective measures are either hardware protection measures or software protection measures. The hardware protection measures include especially techniques for detecting the dismantling of the device.

There are known "false key" techniques used to reinforce security and verify that the terminal has not undergone any dismantling attempt. As illustrated with reference to FIG. 1, a payment terminal 10 classically comprises a housing comprising an upper half-shell 11 and a lower half-shell (not shown) and a printed circuit board 13 within the housing. The payment terminal comprises a protection system based on "false keys". The protection system comprises three pressurizing devices 12 and three false keys 131, 132, 133 disposed on a printed circuit board 13. As illustrated with reference to FIGS. 2a, 2b and 2c, the pressurizing device 12 comprises a tube 121 that receives a flexible pressurizing element 2. When the payment terminal 10 is mounted, the false keys 131, 132, 133 are pressed by the flexible pressurizing elements 2. This makes sure that the payment terminal 10 is not open and therefore that there has been no attempt to introduce a spy device into the keypad of the payment terminal for example.

This prior-art protection solution is inefficient when the two half-shells have a slight spacing between them. It can be seen that a slight separation of the two half-shells does not sufficiently reduce the pressure from the flexible pressurizing elements exerted on the false key. An intrusion into of the device by slight separation of the two half-shells cannot be detected by the protection system.

There is a need to resolve this problem of the prior art.

3. SUMMARY

The present disclosure resolves the problem posed by the prior art. Indeed, the disclosure describes a system for protecting an input device comprising a pressurizing device and a printed circuit board comprising a false key, the pressurizing device comprising a tube receiving a flexible pressurizing element. Such a system comprises a spacer of predetermined length, said spacer being positioned at the bottom of said tube.

Thus, the length of the flexible pressurizing element can be reduced. Besides, such a spacer can advantageously be used during maintenance of an input device in order to replace an excessively lengthy pressurizing element.

According to one particular characteristic, said spacer has adjustable length.

Thus, the spacer can adapt to variations and uncertainties related to the manufacture of the flexible pressurizing elements and the flexible tubes of the flexible pressurizing devices.

According to one particular characteristic, said spacer comprises a male element and a female element, a cavity of predetermined depth being disposed at one end of said female element so that an extremity of said male element can be inserted into said cavity.

According to one particular embodiment, at least one portion at an extremity of said male element is threaded and said cavity of said female element has an internal thread, said internal thread being able to cooperate with said threaded portion of said male element.

Thus, the spacer can be used in pressurizing devices of different sizes.

According to one particular characteristic, said spacer comprises two male elements, another extremity of said female element also comprising a cavity possessing a thread.

According to one particular characteristic, at least one protective mesh is disposed on an internal surface of said tube.

Thus, the pressurizing device enables the detection of attacks against the protection system.

According to one particular characteristic, said spacer is an intrusion detector.

Thus, the pressurizing device enables the detection of intrusions by probes around the pressurizing device.

According to one particular characteristic, said intrusion detector is a capacitive detector.

According to another aspect, the proposed technique also relates to a payment terminal comprising a housing. According to one particular technique, said terminal comprises at least one protection system such as the one described here above.

4. FIGURES

Other features and advantages shall appear more clearly from the following description of one particular embodiment, given by way of a simple, illustratory and non-exhaustive example and from the appended figures, of which:

FIG. 1, already commented upon, is a schematic view of a payment terminal implementing a prior-art protection system;

FIG. 2a, already commented upon, illustrates the body of a prior-art pressurizing device;

FIG. 2b, already commented upon, is a view in section of the pressurizing device of FIG. 2a;

FIG. 2c, already commented upon, is a view in section of a pressurizing device receiving a flexible pressurizing element;

FIGS. 4a, 4b and 4c illustrate a spacer having two different heights;

FIG. 5a illustrates a spacer of adjustable height;

FIG. 5b illustrates a variation of the spacer of FIG. 5a.

5. DESCRIPTION

General Principle

Figure 1:
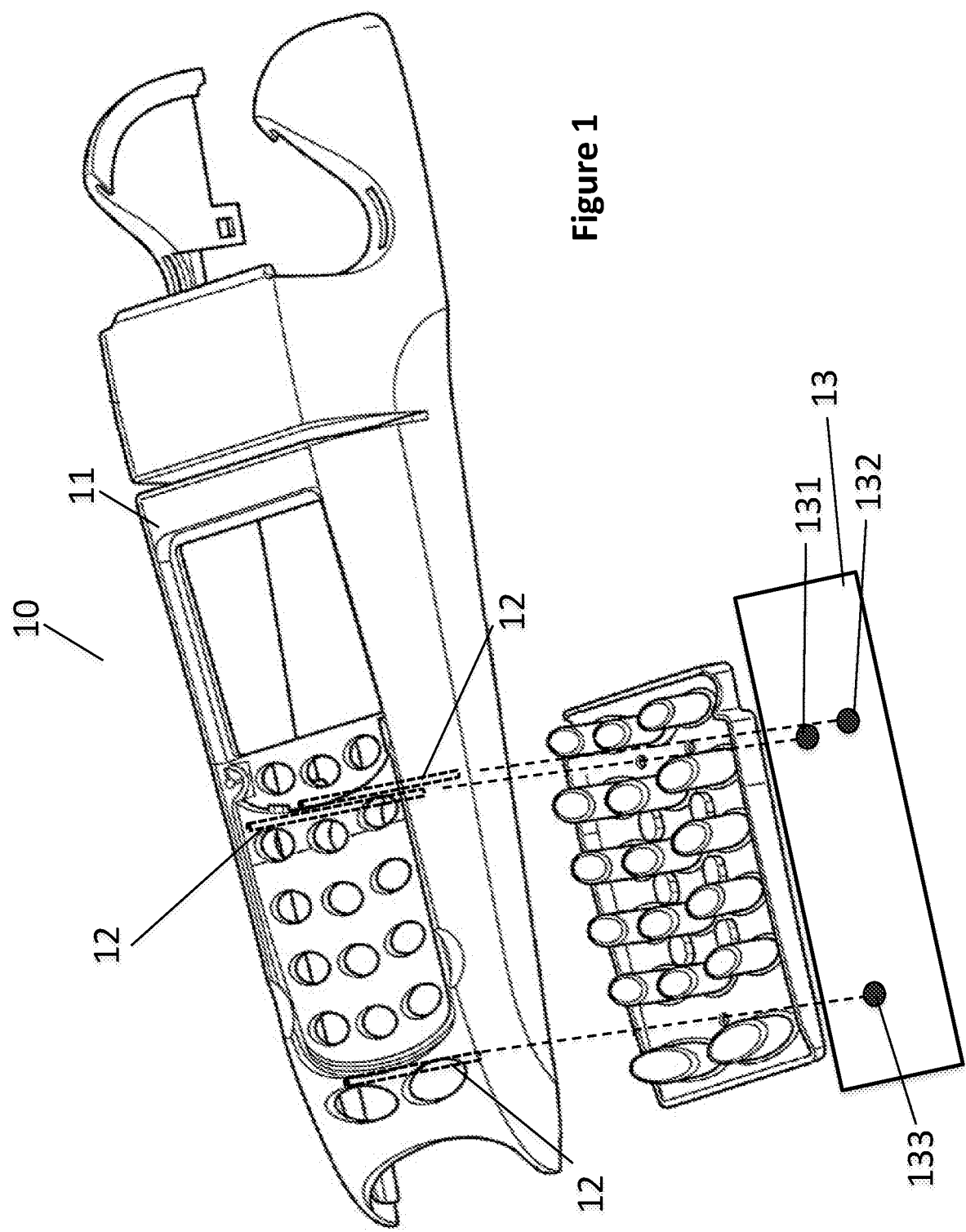
Figure 2A:
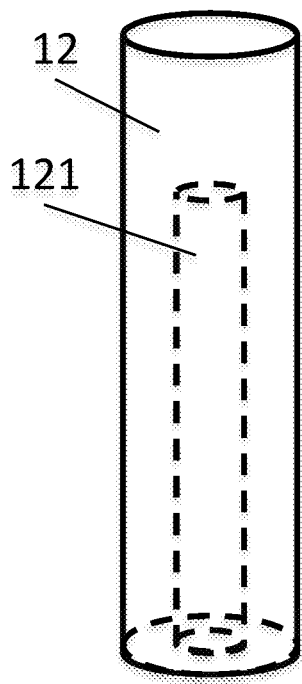
Figure 2B:
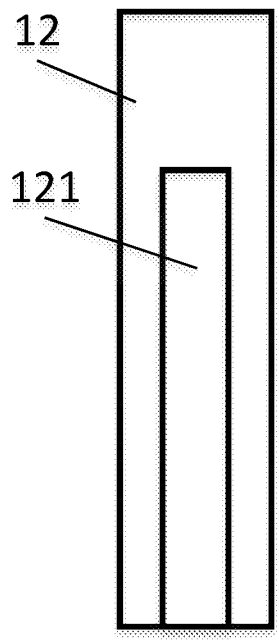
Figure 2C:
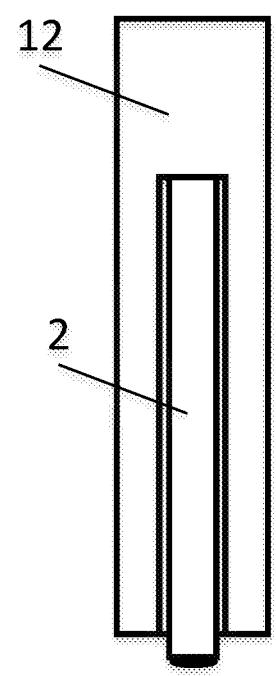

When an input device has a prior-art "false key" protection system, failures and delays are seen in the detection intrusion. When the two half-shells of the input device are slightly separated, it is often not possible to detect the fact that it has been opened. The fact is that a slight separation between the two half-shells does not always result in a sufficient diminishing of the pressure exerted on the false keys by the flexible pressurizing elements. These flexible pressurizing elements are also called pucks. A puck is a cylinder made of flexible and deformable, sometimes electrically conductive, material which can be used to put an external ring and an internal ring in contact on a printed circuit board. When sufficient pressure is exerted on the puck, electrical current passes between the internal ring and the external ring of the false key. When the current passes accurately in this false key, the terminal diagnoses itself as being in a correct operating state. It can also happen that the material is not electrically conductive in which case the metal dome is adjoined to the puck in order to fulfill the function of conducting current between the external ring and the internal ring of the false key.

It happens that the puck, by its deformable nature, is able to continue exerting electrical contact even when the pressure diminishes. A diminishing of the pressure is generally the sign of an opening. Now, the longer the puck (i.e. the greater the cylinder), the greater the need for a large amount of space so that pressure stops being exerted. This is a problem since it is sought precisely, through the use of the puck, to detect the absence of pressure more efficiently.

Now, it is frequent for the length of the puck to be relatively great: this is because the distance between the interior of a half-shell and the printed circuit on which the false key is situated is more or less great (often between 10 mm and 40 mm, depending on the thickness of the terminal). Thus, the tube which extends for example from the interior of an external half-shell of the terminal up to a printed circuit board also has a relatively great length.

The inventors have thus sought a solution to the problem of increasing the variation of the pressure force when the flexible pressurizing element undergoes slight deformation. Hooke's law makes it possible to assess the behavior of solids subjected to low-amplitude deformation. This is a linear elastic relationship. According to Hooke's law, the tensile/compressive force F complies with the following formula:

$$F = k \times \Delta l \quad (1)$$

where k is the stiffness of the part, and $\Delta l$ is the variation in the length of the part.

When the flexible element is pressed on a false key, the flexible element undergoes compression on a length $\Delta l$. The force exerted on the false key is therefore equal to $k \times \Delta l$. For a determined length of compression, the greater the stiffness k, the greater the variation in force. For an input device carrying out a "false key" type of protection system, a slight separation of the upper half-shell leads to a slight diminishing of the length of compression of the pressurizing element. The greater the stiffness k, the greater the reduction of the pressure force. In order to more efficiently detect a slight separation of the upper half-shell, it is desirable for the diminishing of the pressure force to be great.

The stiffness k is the characteristic that indicates the resistance of a body to elastic deformation. In the case of a bar of constant section subjected to tensile-compressive load, the stiffness k is expressed as a function of Young's modulus (E):

$$k = \frac{A \times E}{L} \quad (2)$$

where

A is the area of the section of the bar or of the beam;

E is the modulus of elasticity under tensile-compressive force;

L is the length of the bar or beam.

The modulus of elasticity is an intrinsic parameter or attribute of a material. It is constant for a determined material: for the flexible and deformable material used, the modulus E often ranges from 6 to 7 MPa. To obtain greater stiffness, it is thus necessary either to increase the area of the section (A) of the flexible element or to diminish the length (L) of the flexible pressurizing element. For reasons of compactness of the device and cost of manufacture, it is not desirable to increase the area of the section of the flexible element: the diameter of the flexible element is traditionally of the order of 2 to 4 mm. It is therefore more worthwhile to diminish the length of the flexible pressurizing elements in order to obtain greater stiffness so as to improve the sensitivity of the aperture. One solution could also have consisted in increasing the modulus of elasticity E of the flexible element. Such an increase however is, on the one hand, not easy and, on the other hand, more costly. Indeed, the "puck" type flexible elements consist of a mixture of elastomer and/or silicone. The mixture is furthermore sometimes conductive. This type of material is standard in the industry and it is a cost-effective material. A modification of the modulus of elasticity therefore leads to extra cost which is not necessarily worthwhile. Thus, it is more efficient in terms of cost and process to reduce the length of the puck. A simple solution, at the time of manufacture, would be to fill a variably large portion of the tube with plastic. The inventors however have determined that this simple solution would not enable compliance with all the security constraints imposed on the device (and especially on the payment terminal).

Thus, the general principle of the proposed technique relates to a solution for reducing the length of the flexible pressurizing element. More specifically, the proposed element consists of the use of a spacer made of rigid material to replace a part of the flexible pressurizing element.

The proposed technique enables a "false key" type of protection system to achieve a more sensitive detection of intrusions made through a dismantling of the housing.

Embodiments

Figure 3A:
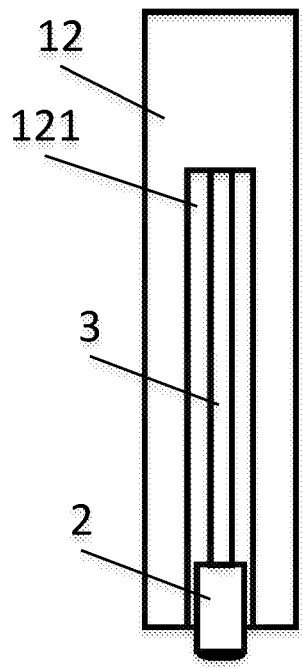
FIG. 3a is a view in section of a pressurizing device comprising a spacer according to one embodiment of the proposed technique.

FIG. 3a is a view in section of a pressurizing device 12 comprising a tube 121, a flexible pressurizing element 2 and a spacer 3. The spacer 3 is positioned at the bottom of the tube. In this embodiment, as shown in FIG. 3a and the following figures, the tube is straight. The spacer takes up a part of the space within the tube. An extremity of a flexible pressurizing element 2 is applied so as to press against the spacer and the other extremity of the flexible pressurizing element extends out of the tube. Thus, the length of the flexible pressurizing element can be reduced because it is no longer inserted up to the bottom of the tube. In one "false key" protection system, the other extremity of the flexible pressurizing element 2 presses on a false key disposed on a printed circuit.

Figure 3B:
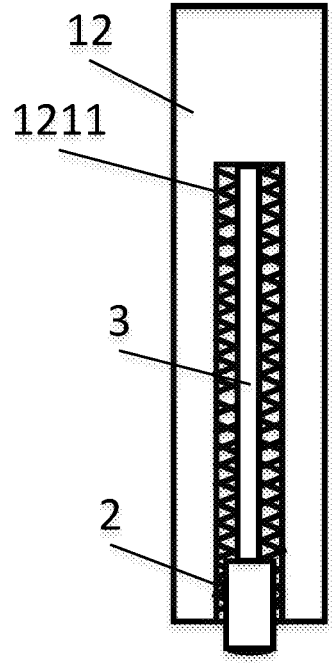
FIG. 3b is a view in section of a pressurizing device comprising a protective mesh.

FIG. 3b is a view in section of a variant of the pressurizing device 12 of FIG. 3a. A protective mesh 1211 is for example disposed on the internal surface of the tube 121 of the pressurizing device 12. In a protection system, the mesh can be connected to a security module to detect attacks on the protection system, especially when an attacker tries to cut off the pressurizing device to deactivate the protection system: such an attack consists in sectioning the tube and maintaining sufficient pressure on the sectioned part that remains in contact with the printed circuit. The presence of a protective mesh averts such an attack because any attempt to cut out a section of the tube leads to a deterioration of the mesh, and this deterioration may thus activate the implementation of one or more security measures.

FIGS. 4a, 4b and 4c illustrate a spacer 3 having two different heights. This spacer 3 comprises a male element 32 and a female element 31. A cavity 311 of predetermined depth is disposed at one extremity of said female element 31. Preferably, the depth of the cavity 311 is a few millimeters. One extremity of the male element 32 can be inserted into the cavity 311. Thus, the spacer 3 can have two different heights. The first height is equal to the sum of the heights of the male element 32 and the female element 31 (the male element 31 is not inserted into the cavity 311 of the female element 31 as illustrated with reference to FIG. 4c). The second height is equal to the first height minus the depth of the cavity 311 (the male element 32 is inserted into the cavity 311 of the female element 31 as illustrated with reference to FIG. 4b). Indeed, for reasons related to manufacture, the heights of the flexible pressurizing elements 2 are not strictly identical. The same applies to the depths of the tubes 121 of the pressurizing devices 12. The two heights enable the spacer to adapt better to the errors of sizes of the flexible pressurizing elements 2 and/or the tubes 121 of the pressurizing devices 12.

FIG. 5a illustrates a spacer 3 of adjustable height. The spacer 3 comprises a male element 32 and a female element 31. A cavity 311 is disposed in the extremity of said female element 31. A portion 321 at one extremity of said male element 32 is threaded. The threaded portion 321 can cooperate with an internal thread on the internal surface of the cavity 311 of the female element 31. The threaded portion of the male element 32 can thus move in the cavity of the female element. The height of the spacer is thus adjustable. According to one variation of the spacer, the spacer can comprise a female element 31 and two male elements 32, as shown in FIG. 5b. Each male element 32 has a threaded portion. The female element 31 has two cavities at its two extremities. Each cavity has a thread on its internal surface. The two threaded portions of the two male elements can cooperate with the threads of the two cavities of the female element and move in the two cavities. Thus, the height of the spacer can be configured more precisely and can be used in pressurizing devices of different sizes.

According to one particular embodiment of the proposed technique, the spacer is an intrusion detector. For example, the spacer can be a capacitive detector that can detect intrusions by probes through the capacitive variations around the pressurizing device.

In certain embodiments, the tube is conical, with a body having a diameter slightly greater than that of the base (3 mm at the body and 2 mm at the base). Thus, the shapes of the spacer and of the puck are adapted to the shape of the tube. Such a configuration occurs for example when the tube is directly molded in the plastic, during the manufacture of the half-shell of the device (for example the terminal) within which it takes position. In other embodiments, the tube is separate from the half-shell and is manufactured separately: the tube can for example be a metal tube that is screwed onto an adapted extension of the half-shell when the device (for example the terminal) within which it takes position) is being assembled.

The invention claimed is:

1. A system for protecting an electronic user input device, the system comprising:
    a printed circuit board comprising a false key;
    a pressurizing device comprising a tube for receiving a flexible pressurizing element at an open end of the tube, the flexible pressurizing element configured to press on the false key at an extremity;
    and
    a spacer made of rigid material and of predetermined length, spacing the flexible pressurizing element apart from a closed end of the tube;
    wherein when a current through the false key falls below a threshold current, the system is configured to indicate tampering.

2. The system for protecting according to claim 1, wherein said spacer has an adjustable length.

3. The system for protecting according to claim 2, wherein said spacer comprises a male element and a female element, a cavity of predetermined depth being disposed at one extremity of said female element so that one extremity of said male element can be inserted into said cavity.

4. The system for protecting according to claim 3, wherein at least one portion at one extremity of said male element is threaded and said cavity of said female element has an internal thread, said internal thread being able to cooperate with said threaded portion of said male element.

5. The system for protecting according to claim 3, wherein said spacer comprises two male elements, another extremity of said female element also comprising a cavity possessing a thread.

6. The system for protecting according to claim 1, wherein at least one protective mesh is disposed on an internal surface of said tube.

7. The system for protecting according to claim 1, wherein said spacer is an intrusion detector.

8. The system for protecting according to claim 6, wherein said intrusion detector is a capacitive detector.

9. A payment terminal comprising:
    a housing having an inner surface;
    a printed circuit board comprising a false key arranged on the inner surface;
    a pressurizing device in the housing and comprising a tube for receiving a flexible pressurizing element at an open end of the tube, the flexible pressurizing element configured to press on the false key at an extremity; and
    a spacer made of rigid material and of predetermined length, spacing the flexible pressurizing element apart from a closed end of the tube;
    wherein when a current through the false key falls below a threshold current, the system is configured to indicate tampering.

* * * * *